United States Patent [19]

Fuchs et al.

[11] Patent Number: 4,983,298
[45] Date of Patent: Jan. 8, 1991

[54] PROCESS FOR THE DISINFECTION AND AEROBIC STABILIZATION OF SEWAGE SLUDGE

[76] Inventors: Leonhard Fuchs; Martin Fuchs, both of Im Stocktal 2, D-5440 Mayen 1, Fed. Rep. of Germany

[21] Appl. No.: 483,045

[22] Filed: Feb. 21, 1990

[30] Foreign Application Priority Data

Feb. 21, 1989 [DE] Fed. Rep. of Germany ....... 3905228
Aug. 31, 1989 [DE] Fed. Rep. of Germany ....... 3928846

[51] Int. Cl.$^5$ ............................................. C02F 11/06
[52] U.S. Cl. .................................... 210/613; 210/614; 210/620; 210/764
[58] Field of Search .............................. 210/612–614, 210/609, 620, 630, 742, 764, 766

[56] References Cited

U.S. PATENT DOCUMENTS

| 3,864,247 | 2/1975 | Fuchs | 210/612 |
| 3,892,660 | 7/1975 | Romell | 210/612 X |
| 4,026,793 | 5/1977 | Rein | 210/613 |
| 4,246,099 | 1/1981 | Gould et al. | 210/613 X |
| 4,276,174 | 6/1981 | Breider et al. | 210/613 |

FOREIGN PATENT DOCUMENTS 0157317 10/1985 European Pat. Off. .
3240009 5/1984 Fed. Rep. of Germany .
2105318 3/1983 United Kingdom .

OTHER PUBLICATIONS

G. W. F.-Wasser/Abwasser, Sep. 1986, No. 9, "Neue Einsatzbereiche für aerob-thermophile Prozesse zur Stabilisierung und Entseuchung von Abwasserschlämmen mit Bioenergienutzung", K. Breitenbücher.

Primary Examiner—Tom Wyse
Attorney, Agent, or Firm—Wegner, Cantorl, Mueller & Player

[57] ABSTRACT

A process for the disinfection and aerobic stabilization of concentrated sewage sludge in several steps, using one or more heat-insulated containers, preferably with stirring, with the addition of an oxygen-containing gas, described wherein (a) the sludge coming in, having been concentrated to at least 2% of dry matter, is caused to reach the thermophilic temperature range of >50° C., with pre-heating if required, and then solely by an aerobic degradation without supplying external heat within from 2 to 4 days, (b) the sludge is disinfected by further aerobic degradation without supplying external heat at about 50° C. to 55° C. for at least 20 hours or at >55° C. for at least 10 hours, and (c) the sludge is stabilized to become mesophilic by way of actively cooling it down to about 25° C. to 45° C. and a further aerobic degradation within about 2 to 8 days, and preferably within from 3 to 5 days.

11 Claims, No Drawings

PROCESS FOR THE DISINFECTION AND AEROBIC STABILIZATION OF SEWAGE SLUDGE

The present invention relates to a process for the disinfection and aerobic stabilization of concentrated sewage sludge in several steps, employing one or more heat-insulated containers, preferably with stirring, with the addition of oxygen-containing gas.

A prior art process has been described, for example, in "Korrespondenz Abwasser", 29th year, 1982, pp. 203-207. In this process, the entering crude sludge, after having been statically concentrated, is aerated with simultaneous intense mixing in two heat-insulated reactors connected in series. In the reactor I, the temperature variation is predominantly around the upper mesophilic range, whereas in the reactor II thermophilic temperatures (above 45° C.) are permanently maintained. With sufficiently long residence time of each batch in reactor II and maintainance of the temperatures above 50° C., disinfection is achieved. The settling behavior of the treated sludge is generally only insignificantly improved over that of the crude sludge. Also, the quality of the issuing sludge liquor is often unsatisfactory; this sludge liquor, in general is recycled into the biological waste water purification. The sewage sludge, aerobically stabilized and disinfected in accordance with the known process, has been used in the past as a fertilizer. However, this use has been restricted by recent laws and regulations so that in the future the sewage sludge obtained will often have to be disposed of or combusted. Thus, it is of particular importance that the treated sewage sludge can be readily thickened and dehydrated and that a sludge liquor water is obtained which has a low residual contamination.

Thus, it is the object of the invention to develop a process for the disinfection and aerobic stabilization of concentrated sewage sludge in several steps, using one or more heat-insulated containers, preferably with stirring, with the addition of oxygen-containing gas. The process works safely and reliably, disinfects and stabilizes perfectly, even under conditions of varying crude sewage sludge input, varying temperatures of the crude sewage sludge, and/or the environment. The process avoids unacceptable odor problems, is comparable to current processes in cost aspects and provides a well-settling sludge with a water effluent of low contamination.

This object can be attained in a surprisingly simple and reliable way by a process wherein (a) the entering sludge, which has been concentrated to at least 2% of dry matter, is caused to reach the thermophilic temperature range of >50° C., with preheating if required, then solely by aerobic degradation without supplying external heat, within from 2 to 4 days, (b) the sludge is disinfected by further aerobic degradation without supplying external heat at about 50° C. to 55° C. for at least 20 hours or at >55° C. for at least 10 hours, and (c) the sludge is stabilized at mesophilic temperature by active cooling to from 25° C. to 45° C. and further aerobic degradation within from 2 to 8 days, and preferably within from 3 to 5 days.

In the simplest embodiment of the process, the steps (a), (b) and (c) are carried out in the same container. That container is furnished with a heat exchanger, for example one using pipe coils or flushable plate-coolers, in order to optionally pre-heat the concentrated crude sludge, but mostly to carry away the heat at the end of step (b) and during the step (c) and thereby to effect the active cooling.

By this way the process in a one-container process, wherein virtually all of the three steps in sequence are carried out in the same tank. That one container-process, in order to effectively utilize the heat to be removed at the end of step (b) and, in addition, to increase the flexibility of the process, may be extended in that two or more batches are run in two or more containers at different times so that the amount of heat recovered at the beginning of step (c) of a preceding batch is employed for pre-heating the concentrated crude sludge of step (a) of a subsequent batch.

When the size of the entire plant and the flexibility thereof justifies it, three or more containers can be provided and another embodiment of the process can be used, which is particularly simple and economical, in which embodiment the steps (a), (b) and (c) are allowed to take place in three separate stages A, B and C connected in series, wherein the containers of the stages B and C have capacities several times the capacity of the container of stage A.

The heating of the crude sludge in stage A is generally effected by way of heat exchange with the sludge in stage C. However, it is also possible to effect the heating of the crude sludge in stage A by way of a heat exchange with the sludge of stage B. If desired, heat may be extracted also from the effluent from stage C.

It has been found that in the regular operation of stage C, more heat is released and has to be removed than is required for warming the concentrated crude sludge in stage A. Thus, amounts of heat from stage C exceeding the amount of heat needed in stage A are removed by heat exchange and can be utilized otherwise, if desired.

It is of course possible to satisfy the heat requirements of stage A also in part by means of a heat exchange with the sludge in stage B. Thus, once the sludge has been disinfected in stage B, prior to a new feeding operation, heat may be transferred to stage A from stage B in order to further increase the temperature in the former stage. It is further possible to ancillarily supply the energy needed to adjust the temperature in stage A and in stage B from other heat sources. This possibility of supplying heat from other heat sources is particularly contemplated for the case that, due to malfunctions in the microbiology etc., the optimum temperature relations in the stages must first be reestablished.

According to the invention, the temperature in stage A must be at least 25° C. prior to transferring a batch to stage B. Temperatures in excess of 45° C. occur rarely in stage A, because even with stronger aeration in stage A, the temperature rise due to aerobic degradation is not so fast that the maximum temperatures of stage C will be essentially exceeded. The supply to stage A may be batch or continuous. Stage A is preferably agitated and aerated, but this is not absolutely required.

In contrast thereto, the aerobic degradation in stage B is so vigorous that temperatures in excess of 50° C. will be generated. At temperatures between 50° C. and 70° C., with appropriate residence times, the disinfection is safely assured. Thus, the time between two feeding cycles can be made to depend on the temperature in stage B. At 50° C., a time between two feeding cycles of one day will be sufficient. With temperatures in excess of 65° C., even a time between two feeding cycles of three hours will be sufficient to obtain a perfect disinfection. However, as a safety measure, disinfection should be carried out for at least ten hours. The temperature in stage B can be controlled by the amount of the oxygen supply. In addition, it may also be made to depend on the time available between two feeding cycles. Thus, in the case of an increase in the amount of concentrated crude sludge coming in, not only can the batch size be increased, but the residence time of the sludge in the stages A, B and C can also be reduced by increasing the temperature in stage B. This flexibility is an additional advantage which further broadens the range of utility of the process according to the invention.

Moreover, the variation in the amounts of concentrated crude sludge to be processed can be compensated by an appropriate adaption of the filling height in the containers and, if necessary, by turning on or off additional containers connected in parallel or in series and operating for the respective stage.

In stage C, the temperature is reduced to from 25° C. to 45° C., and preferably to about 35° C. At these temperatures there is formed a sludge which has an especially good settling behavior and an effluent with low contamination.

The average residence times in general are:
in stage A—from 0.25 to 2.5 days, and preferably about one day,
in stage B—from 1 to 6 days, and preferably from 2 to 3 days, and
in stage C—from 1 to 8 days, and preferably from 3 to 4 days.

As the feed material for the process of the invention there is used, more particularly, a concentrated sewage sludge, as that from mechanical and/or biological purification of sewage or industrial waste waters, wherein a solids content of from 2 to 8% has been attained by static and/or machine concentration. Such concentrated sewage sludges in general, have a sufficient content of degradable matter required for the exothermal aerobic degradation in stage B, while, on the other hand, they still have rheological properties so that they are easy to handle. More specifically, in a one-container process with no pre-heating of the concentrated crude sludge, it is recommended to increase the solids content of the crude sludge to at least 3% of dry matter, and preferably to at least 4 to 8% of dry matter. At these higher solids contents, the onset of the aerobic degradation will be sufficiently fast and vigorous, so that the thermophilic temperature range will be reached within the desired period in from 2 to 4 days. In contrast thereto, in a multi-stage process including a pre-heating operation in the stage A, it is quite possible to also work with a more diluted crude sludge containing only 2% of dry matter.

The supply of the oxygen-containing gas is generally effected by aeration. In special cases, more or less pure oxygen may be added as well. Oxygen-containing gases having an oxygen-content of less than 15% are only used as an exception, because then the oxygen supply becomes increasingly uneconomical. Furthermore, with such low-oxygen gases care is needed to ensure that anaerobic degradation is avoided, since this results in an odor problem.

The oxygen supply may be controlled by the intensity of aeration and/or the oxygen content of the gas supplied.

Agitation and aeration in the stages B and C and, optionally, in stage A can be effected by any means known in waste water technology and process technology. Aerating stirrers such as those manufactured, for example, by the company Fuchs Gas- und Wasser-technik, Mayen, have proven to be particularly useful in the process of the invention.

The containers may be any of the reactors equipped with a stirrer and gas-introducing means as conventionally used in waste water technology, which reactors preferably may also be provided with additional foam cutters and foam controllers. Heat supply and removal is effected by means of conventional heat exchangers. Undesirable heat losses are eliminated by providing the containers with a sufficient heat insulation.

The process of the invention can be employed not only for the disinfection and aerobic stabilization of sewage sludge, but also for the treatment of liquid manure and other organic concentrates such as yeast wastes, etc.. It has been shown that the process of the invention reliably and flexibly results in disinfection and good stabilization, whereby a well-settling sewage sludge and a sludge liquor of good quality and low residual contamination are formed. In contrast to only thermophilic or anaerobic degradation processes, no odor nuisance is produced. Due to the mesophilic residue stabilization, ammonium is also largely subjected to nitrification, whereby the pH value decreases from a value in excess of 8 to the neutral range or somewhat lower.

What is claimed is:

1. A process for the disinfection and aerobic stabilization of concentrated sewage sludge in several steps employing one or more heat-insulated containers and addition of an oxygen-containing gas, said process comprising:
   (a) providing entering sludge concentrated to at least 2% of dry matter, causing the sludge to reach a thermophilic temperature range about 50° C. in about 2 to 4 days, and maintaining the thermophilic temperature range solely by aerobic degradation and without supplying external heat;
   (b) disinfecting the sludge by further aerobic degradation without supplying external heat either at about 50° C. to 55° C. for at least 20 hours, or above 55° C. for at least 10 hours; and
   (c) stabilizing the sludge at mesophilic temperature with active cooling to about 25° C. to 45° C., and allowing further aerobic degradation for about 2 to 8 days.

2. The process according to claim 1, wherein the steps (a), (b) and (c) are carried out in the same container.

3. The process according to claim 1, wherein two or more batches are run in two or more containers at different times so that the amount of heat recovered in the beginning of step (c) of a preceding batch is employed for pre-heating the entering sludge of step (a) of a subsequent batch.

4. The process according to claim 1, wherein the steps (a), (b) and (c) are carried out in three separate stages A, B and C connected in series and wherein the containers of the stages B and C have capacities several times the capacity of the container of stage A.

5. The process according to claim 4, wherein the heating of the entering sludge in stage A is effected by way of heat exchange with the sludge of stage C.

6. The process according to claim 4, wherein one batch corresponds to the amount of entering sludge entering in 0.2 to 2 days.

7. The process according to claim 5, wherein one batch corresponds to the amount of entering sludge entering in 0.2 to 2 days.

8. The process according to claim 4, wherein the average residence time of the sludge is:
in stage A from 0.25 to 2.5 days,
in stage B from 1 to 6 days, and
in stage C from 1 to 8 days.

9. The process according to claim 4, wherein the average residence time of the sludge is:
in stage A about 1 day,
in stage B about 2 to 3 days, and
in stage C about 3 to 4 days.

10. The process according to claim 1, wherein a variation in the amount of entering sludge to be processed is compensated by at least one of an appropriate adaptation of filling height in the containers, or by turning on or off additional containers connected in parallel or in series employed for the respective stage.

11. The process according to claim 1, wherein addition of oxygen is controlled by at least one of intensity of aeration, time of aeration, or oxygen content of the oxygen-containing gas supplied.

* * * * *